US010533513B2

(12) United States Patent
Coulter

(10) Patent No.: US 10,533,513 B2
(45) Date of Patent: Jan. 14, 2020

(54) DETECTING AND PREVENTING TWO-PHASE FLOW TO GASEOUS FUELED ENGINES

(71) Applicant: Halliburton Energy Services, Inc., Houston, TX (US)

(72) Inventor: Jonathan Barrett Coulter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 283 days.

(21) Appl. No.: 15/515,224

(22) PCT Filed: Oct. 31, 2014

(86) PCT No.: PCT/US2014/063292
§ 371 (c)(1),
(2) Date: Mar. 29, 2017

(87) PCT Pub. No.: WO2016/068965
PCT Pub. Date: May 6, 2016

(65) Prior Publication Data
US 2017/0234258 A1    Aug. 17, 2017

(51) Int. Cl.
*F02D 41/30* (2006.01)
*G01F 1/74* (2006.01)
(Continued)

(52) U.S. Cl.
CPC ......... *F02D 41/3005* (2013.01); *F02D 41/26* (2013.01); *G01F 1/74* (2013.01);
(Continued)

(58) Field of Classification Search
CPC ................................................ F02D 41/3005
(Continued)

(56) References Cited

U.S. PATENT DOCUMENTS

2005/0016292 A1    1/2005 Dutton et al.
2009/0009650 A1    1/2009 Liu et al.
(Continued)

FOREIGN PATENT DOCUMENTS

CA    2389145    2/2007
CA    2962260    2/2019

OTHER PUBLICATIONS

International Patent Application No. PCT/US2014/063292 , "International Search Report and Written Opinion", Jul. 21, 2015, 14 pages.

*Primary Examiner* — Justin Seo
*Assistant Examiner* — Rodney T Frank
(74) *Attorney, Agent, or Firm* — Kilpatrick Townsend & Stockton LLP

(57) ABSTRACT

A system can include a flow measurement device positionable in a flow path for measuring a property of the fuel flowing through the flow path and a shutdown device positionable in the flow path for controlling the fuel flow through the flow path. The system can also include a computing device that is communicatively coupled to the flow measurement device for receiving the fuel flow property and from which the presence of two-phase flow or multiphase flow can be detected. The computing device is also communicatively coupled to the shutdown device for controlling fuel flow through the flow path in response to the detection of two-phase flow or multiphase flow.

20 Claims, 7 Drawing Sheets

(51) Int. Cl.
*G01F 1/84* (2006.01)
*G01F 9/00* (2006.01)
*F02D 41/26* (2006.01)
*G05B 15/02* (2006.01)
*E21B 33/13* (2006.01)
*F02M 21/02* (2006.01)
*E21B 43/26* (2006.01)

(52) U.S. Cl.
CPC ............ *G01F 1/8436* (2013.01); *G01F 9/006* (2013.01); *G05B 15/02* (2013.01); *E21B 33/13* (2013.01); *E21B 43/26* (2013.01); *F02M 21/0215* (2013.01); *F02M 21/0242* (2013.01); *Y02T 10/32* (2013.01)

(58) Field of Classification Search
USPC ........................................................ 73/61.44
See application file for complete search history.

(56) References Cited

U.S. PATENT DOCUMENTS

| | | | |
|---|---|---|---|
| 2010/0280757 A1 | 11/2010 | Agar et al. | |
| 2013/0133948 A1 | 5/2013 | Lovorn et al. | |
| 2013/0333644 A1* | 12/2013 | Shigetoyo | F02M 53/04 123/41.08 |
| 2014/0041642 A1* | 2/2014 | Tsutsumi | F02M 31/00 123/541 |
| 2014/0137643 A1 | 5/2014 | Henry et al. | |

* cited by examiner

DETECTING AND PREVENTING TWO-PHASE FLOW TO GASEOUS FUELED ENGINES

CROSS-REFERENCE TO RELATED APPLICATIONS

This is a U.S. national phase under 35 U.S.C. 371 of International Patent Application No. PCT/US2014/063292 titled "Detecting and Preventing Two-Phase Flow to Gaseous Fueled Engines" and filed Oct. 31, 2014, the entirety of which is incorporated herein by reference.

TECHNICAL FIELD

The present disclosure relates generally to systems for detecting two-phase and multiphase flow in a fuel flow from a gas source to a machine engine that consumes gaseous fuel. More particularly (although not necessarily exclusively) the disclosure relates to detecting two-phase flow or multiphase flow by measuring one or more properties related to the fuel flow and stopping fuel flow to engine when two-phase flow or multiphase flow is detected.

BACKGROUND

Equipment having an engine that consume gaseous fuel can be damaged when the fuel gas flowing to the engine from a fuel source, for example a fuel tank or gas producing wellbore, contains liquids, which may involve the fuel flow having two-phase flow or having multiphase flow.

DETAILED DESCRIPTION

Figure 1:
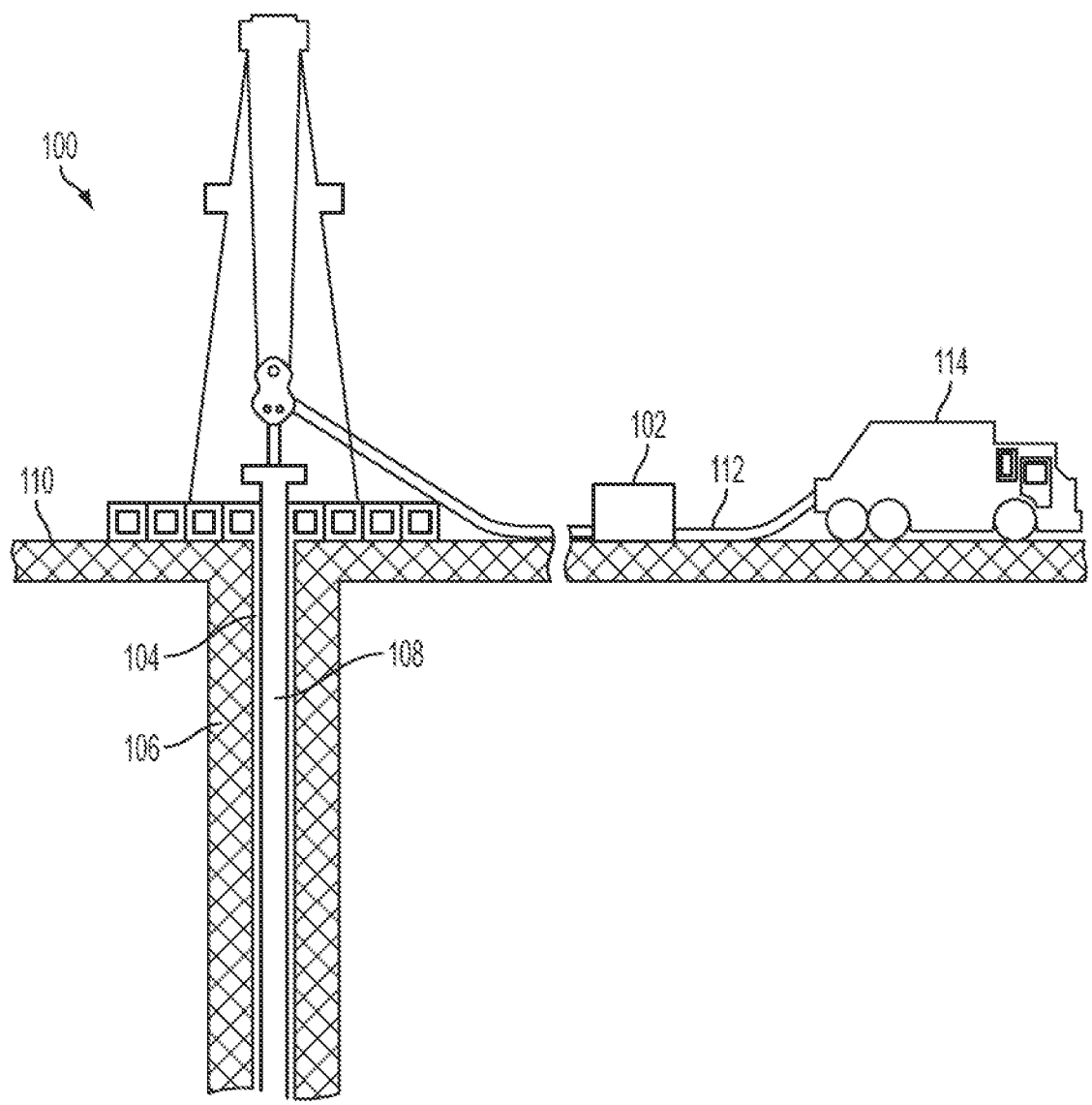
FIG. 1 is a schematic illustration of a well system including an emergency shutdown system according to one aspect of the present disclosure.

Certain aspects and features of the present disclosure relate to detecting the presence of two-phase flow or multiphase flow in a fuel flow passing through a flow path from a fuel gas source or supply to a gaseous fuel consuming engine, for example spark ignited engines or dual fuel engines that consume diesel and natural gas. In one aspect, the fuel gas source may be a fuel tank that provides fuel gas to equipment having gaseous consuming engines. The equipment can be equipment used during drilling and hydraulic fracturing operations, for example hydraulic fracturing trucks and cementing equipment. In another aspect, the fuel gas source may be a natural gas producing wellbore. The presence of two-phase flow or multiphase flow can be detected by measuring one or more properties of the fuel flow.

A flow measurement device, for example but not limited to a coriolis flow meter, can be positioned in a flow path between a fuel source and a fuel gas consuming engine. The flow measurement device can measure various properties of the fuel flow travelling through the flow path, for example the drive gain, the fluid density, and the mass flow rate of the fuel flow.

A shutdown device can be positioned in the flow path between the flow measurement device and the engine. The shutdown device can control the fuel flow to the engine. For example, the shutdown device can be a valve having an open position that allows fuel to flow through the flow path to the engine and a closed position that prevents fuel from flowing through the flow path to the engine. In other aspects, the shutdown device can be any suitable device for restricting fuel flow through a flow path.

The flow measurement device can be in communication with a data acquisition system or other type of computing device via wired or wireless communication link. The computing device can receive a measurement of the property of the fuel travelling through the flow path over a period of time. In some aspects, the computing device can store the measurement. The measurement may be used to calculate additional values, for example the computing device may use the mass flow rate measurements received over a period of time to calculate a rate of change of the mass flow rate.

The presence of two-phase flow (e.g., gas-liquid flow) in the fuel flow may result in changes in the measured properties. The computing device may determine the presence of two-phase flow by comparing a measured property of the fuel to a pre-set limit or value. The pre-set limit may be received by the computing device from input by a user. If the measured property exceeds the pre-set limit, the computing device may instruct the shutdown device to stop the fuel flow through the flow path to the engine. In some aspects, the computing device may trigger a notification or alarm indicating the presence of two-phase flow when the measured property exceeds the pre-set limit. The computing device can be in communication with the shutdown device via a wired or wireless communication link.

In some aspects, the computing device may determine a rate of change in the measured property, for example the rate of change of the mass flow rate over a period of time. The computing device may receive and store measurements of the mass flow rate over a period of time. The computing device may determine a rate of change in the measured property. For example, the computing device may determine the rate of change of the mass flow rate of the fuel flow over a period of time. The computing device may determine if the rate of change in the property exceeds a pre-set limit. When the computing device determines the pre-set limit is exceeded, the computing device may instruct the shutdown device to stop the fuel flow to the engine.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic illustration of a natural gas producing well system 100 that includes an emergency shutdown system 102 according to one aspect of the present disclosure. The well system 100 includes a bore that is a wellbore 104 extending through various earth strata. In FIG. 1, the wellbore 104 extends through a natural gas bearing subterranean formation 106. A tubing string 108 extends from the surface 110 into the wellbore. The tubing string 108 can provide a conduit for natural gas extracted from the formation to travel from the formation 106 to the surface 110. The natural gas can travel to the surface 110 where it is used as fuel for equipment 114 having a gaseous consuming engine. The equipment 114 may be equipment used during drilling and fracking operations. In one aspect, the natural gas can flow from formation 106 to the equipment 114 having a gaseous consuming engine. In one aspect, the natural gas can flow from the formation 106 to the surface 110 and be collected and stored in a tank or other suitable storage container prior to its use as fuel for the equipment 114. The natural gas extracted from the formation 106 can also flow to the surface 110 and to gas conditioning equipment that can remove liquids present in the natural gas. In some aspects, the emergency shutdown system 102 can be positioned in a flow path between the gas conditioning equipment and the equipment 114 having a gaseous consuming engine to prevent damage to the equipment 114 when the gas conditioning equipment fails to remove all the liquid where two-phase flow or multiphase flow is present.

In FIG. 1, the emergency shutdown system 102 is positioned in a flow path 112 of the gas producing wellbore 104 and the equipment 114 having a gaseous consuming engine. In some aspects, the source of the fuel gas may be a gas storage tank, gas conditioning equipment, or other suitable gas source.

The emergency shutdown system 102 may detect the presence of two-phase flow or multiphase flow in the fuel gas flowing from the gas producing wellbore 104 to the equipment 114. Upon detecting the presence of two-phase flow or multiphase flow, the emergency shutdown system 102 may stop the flow of the fuel gas through the flow path 112 to prevent the two-phase flow or multiphase flow from reaching the engine of the equipment 114.

Figure 2:
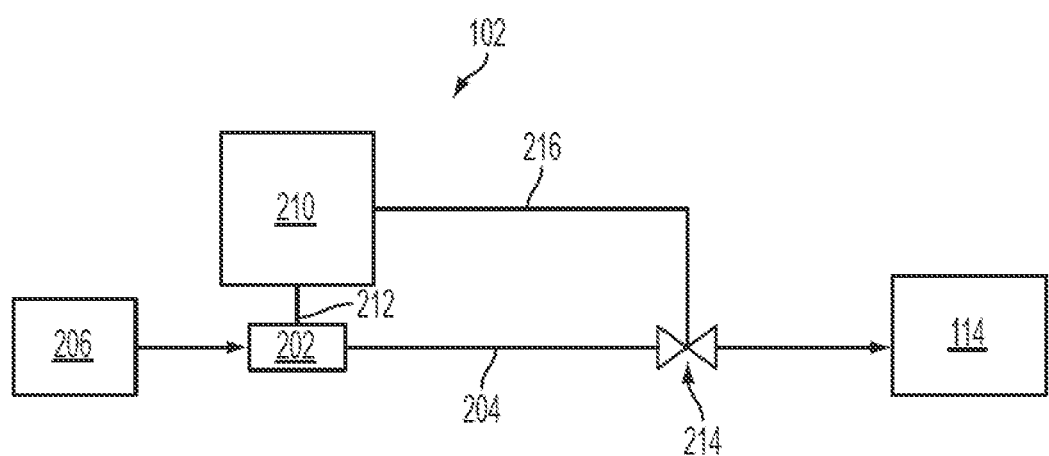
FIG. 2 is a schematic illustration of the emergency shutdown system of FIG. 1 according to one aspect of the present disclosure.

FIG. 2 is a schematic illustration of an aspect of the emergency shutdown system 102 of FIG. 1 that includes a coriolis flow meter 202 positioned in a flow path 204 between a fuel gas source 206 and equipment 114 having a gaseous consuming engine. In some aspects, a mass flow meter, densometer, or other suitable flow measurement device may be used instead of the coriolis flow meter 202. The coriolis flow meter 202 may measure various properties of the fuel flowing through flow path 204. For example, the coriolis flow meter 202 can measure the drive gain, the liquid density, or the mass flow rate of the fuel flowing through the flow path 204.

The computing device 210 may receive the measurement of the fuel flow property from the coriolis flow meter 202. An example of the computing device 210 is described in further detail with respect to FIG. 3. In some aspects, the coriolis flow meter 202 may output a signal having a current that corresponds to the measurement of the property of the fuel. The coriolis flow meter 202 may communicate the measurement to the computing device 210 via communication link 212. The communication link 212 can be wired and can include interfaces such as Ethernet, USB, IEEE 1394, or a fiber optic interface. In another aspect, the communication link 212 can be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network).

The presence of two-phase flow (e.g., liquid and gas) or multiphase flow (e.g., liquid, gas, and oil) in the fuel gas flow may result in changes to the properties measured by the coriolis flow meter 202. For example, single phase gas flow has a drive gain of less than 5% while upon the introduction of a fluid in the fuel flow (two-phase flow) the drive gain can quickly increase to a value greater than 5%. Single phase gas flow can also have a liquid density measurement near zero, while two-phase flow and multiphase flow can have a liquid density measurement greater than zero. When the drive gain measurement or liquid density measurement of the fuel flow passing through the coriolis flow meter 202 is larger than a pre-set limit it can indicate the presence of two-phase flow or multiphase flow. The pre-set limit can be determined by testing various limits to determine what value prevents two-phase flow or multiphase flow from passing undetected through the coriolis flow meter 202.

In some aspects, two-phase flow can include water and gas and multiphase flow can include water, oil or liquid hydrocarbons, and gas in a single flow. The measured properties of the fuel flow may behave similarly when multiphase flow is present as when two-phase flow is present. The pre-set limits that may indicate the presence of multiphase flow may be the same as the pre-set limits that indicate the presence of two-phase flow. In another aspect, the pre-set limits for two-phase flow and multiphase flow may be different. In one aspect, the pre-set limits for two-phase flow and the pre-set limits for multiphase flow can be determined by testing various limits to determine what value prevents two-phase flow or multiphase flow from passing undetected through the coriolis flow meter 202. The pre-set limit associated with each property of the fuel flow (e.g., drive gain, liquid density, and mass flow rate) can be received by the computing device 210 from input by a user.

In some aspects, the computing device 210 may store the property measurement received from the coriolis flow meter 202. For example, the computing device 210 may receive and store measurements of the mass flow rate of the fuel flow over a period of time. The computing device 210 may determine the rate of change of the mass flow rate using the stored measurements. When the rate of change of the mass flow rate is larger than a pre-set limit it can indicate the presence of two-phase flow or multiphase flow.

The computing device 210 is in communication with a shutdown device 214 via a wired or a wireless communication link 216. In one aspect, the communication link 216 can be wired and can include interfaces such as Ethernet, USB, IEEE 1394, or a fiber optic interface. In another aspect, the communication link 216 can be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). The shutdown device 214 is positioned in the flow path 204 between the coriolis flow meter 202 and the equipment 114 having a gaseous consuming engine. The shutdown device 214 controls the flow of fuel through the flow path 204. For example, the shutdown device 214 can be a valve having an open position that allows fuel to flow through the flow path 204 to the engine of the equipment 114 and a closed position that prevents fuel from flowing through the flow path 204 to the equipment 114. In some aspects, the computing device 210 can be a valve controller that is in communication with a valve (the shutdown device 214) that controls the flow of the fuel through the flow path 204 to the engine of the equipment 114.

If the computing device 210 determines that the measurement of the property of the fuel flow exceeds the pre-set limit, the computing device 210 may instruct the shutdown device 214 to stop fuel flow through the flow path 204 to the engine of the equipment 114. In some aspects, the computing device 210 may also trigger a notification or alarm indicating the presence of two-phase flow when the measurement exceeds the pre-set limit. The notification or alarm may be transmitted to a separate location and may be an audible sound or a visual indicator. In some aspects, the notification may be a communication such as an e-mail, an SMS message, or another suitable communication.

Figure 3:
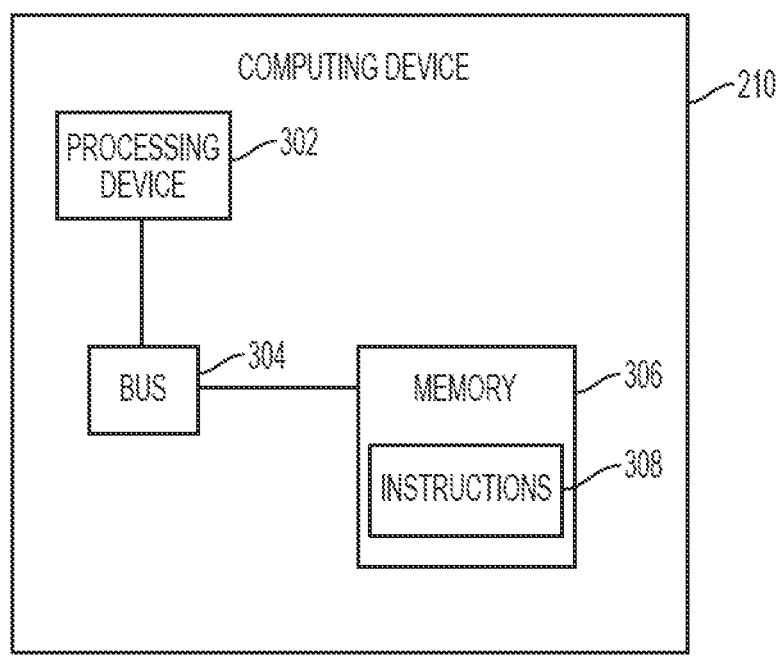
FIG. 3 is a block diagram depicting an example of a computing device for detecting two-phase flow or multiphase flow using fuel flow property measurements according to one aspect of the present disclosure.

FIG. 3 is a block diagram depicting an example of a computing device 210 for detecting two-phase or multiphase flow using fuel flow property measurements according to one aspect of the present disclosure. The computing device 210 includes a processing device 302, a memory device 306, and a bus 304.

The processing device 302 can execute one or more operations for detecting two-phase flow or multiphase flow and controlling a shutdown device. The processing device 302 can execute instructions 308 stored in the memory device 306 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessor, etc.

The processing device 302 can be communicatively coupled to the memory device 306 via the bus 304. The non-volatile memory device 306 may include any type of memory device that retains stored information when powered off. Non-limiting examples of the memory device 306 include electrically erasable and programmable read-only memory ("EEPROM"), flash memory, or any other type of non-volatile memory. In some aspects, at least some of the memory device 306 can include a medium from which the processing device 302 can read the instructions 308. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language including, for example, C, C++, C#, etc.

Figure 4:
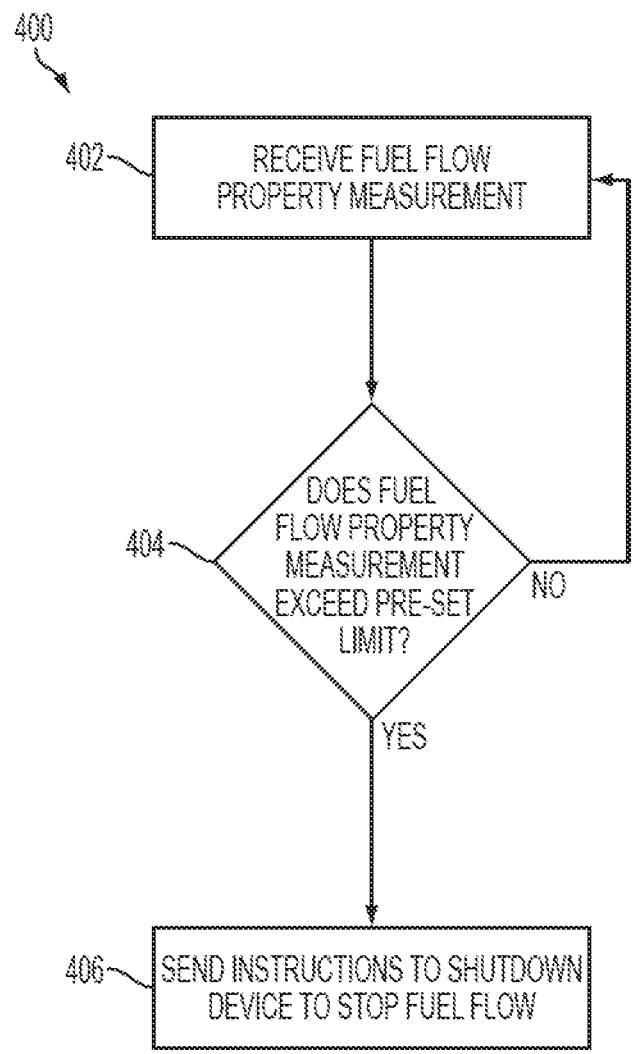
FIG. 4 is an example of a flow chart for a process of detecting the presence of two-phase flow or multiphase flow according to one aspect of the present disclosure.

FIG. 4 depicts a flow chart of an example of a process 400 for detecting two-phase flow or multiphase flow and controlling a shutdown device according to one aspect of the present disclosure. The process 400, or at least part of the process 400, can be performed by a computing device, such as the computing device 210 of FIG. 2 and FIG. 3, according to one aspect. At block 402, the computing device receives from a coriolis flow meter or other suitable flow measurement device a measurement of a property of the fuel flow. The property of the fuel flow can be for example the fluid density, the drive gain, or the mass flow rate of the fuel flow.

In some aspects, the computing device can be a limit alarm that measures a current received from the coriolis flow meter. The current can correlate to the measurement of the property measured by the coriolis flow meter. For example, the current output by the coriolis flow meter to the alarm device can correlate to the drive gain or fluid density of the fuel flow measured by the coriolis flow meter. The computing device can receive the measurement from the coriolis flow meter via a control line or other communication link. In some aspects, the computing device may store the measurement.

At block 404, the computing device determines if the measurement received from the coriolis flow meter exceeds a pre-set limit. The computing device can receive the pre-set limit from input by a user. The pre-set limit may be the same for one or more of the flow properties. For example, the pre-set limit of the current from the coriolis flow meter can be the same whether the coriolis flow meter is measuring the drive gain or the fluid density of the fuel flow. If at block 404 the computing device determines that the measurement received from the coriolis flow meter does not exceed the pre-set limit, then the process returns to block 402.

If at block 404 the computing device determines that the measurement received from the coriolis flow meter exceeds the pre-set limit, then at block 406 the computing device instructs a shutdown device to stop fuel flow through the flow path to the engine. The shutdown device is positioned between the coriolis flow meter and the engine. The shutdown device can be a valve or other suitable device for obstructing fuel flow through the flow path. In another aspect, the computing device may be in communication with the engine via a communication link and may transmit an instruction to the engine to shut down the engine in addition to or in place of instructing the shutdown device to stop fuel flow to the engine.

Figure 5:
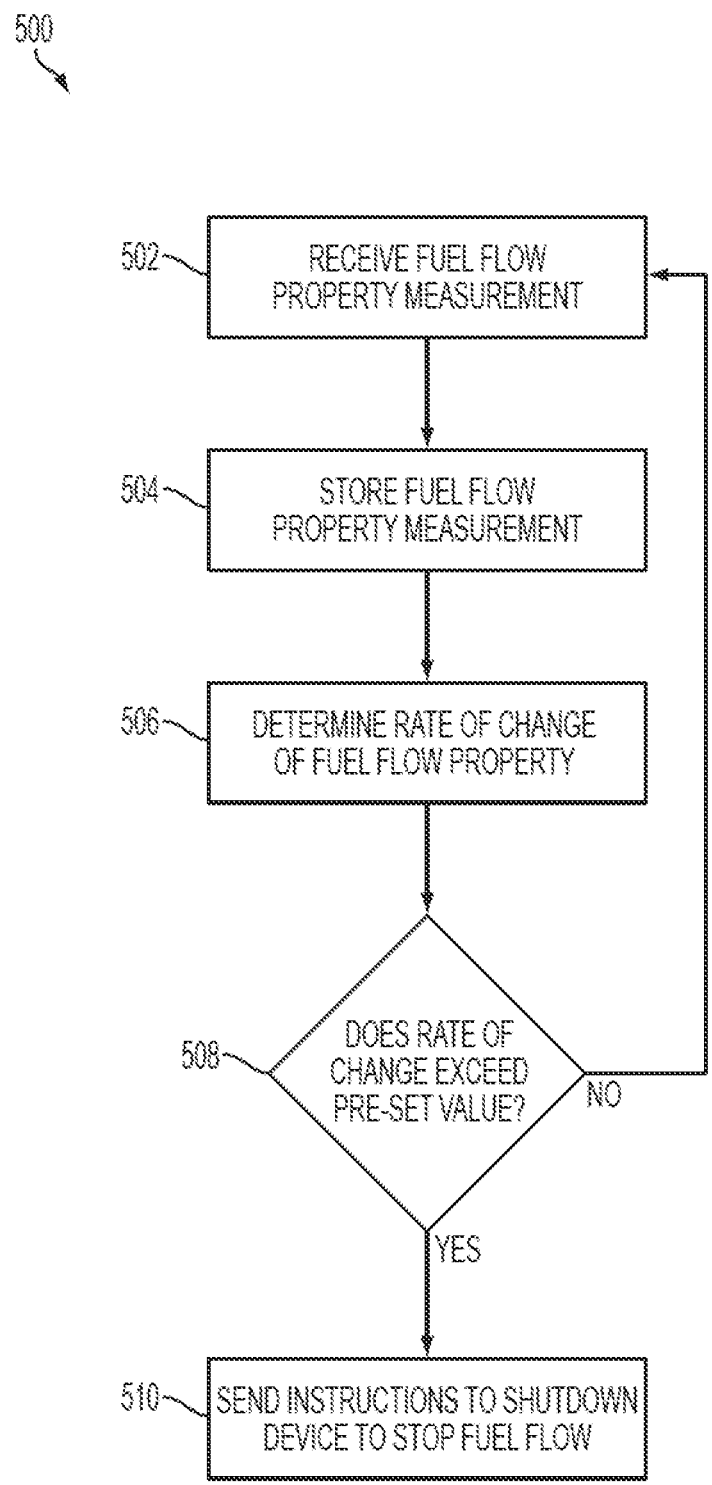
FIG. 5 is an example a flow chart for a process of detecting the presence of two-phase flow or multiphase flow according to one aspect of the present disclosure.

FIG. 5 depicts a flow chart of an example of a process 500 for detecting two-phase flow or multiphase flow and controlling a shutdown device according to one aspect of the present disclosure. The process 500, or at least part of the process, can be performed by a computing device, such as the computing device 210 of FIG. 2 and FIG. 3.

At block 502, the computing device receives from a coriolis flow meter, or other suitable flow measurement device, a measurement of property of the fuel flow, for example the mass flow rate. In block 504, the computing device can store the measurement received at block 502. The computing device may store the measurement in temporary or long term memory. In some aspects, the computing device may store the measurement in a data store.

At block 506, the computing device determines the rate of change of the fuel flow property over a period of time. The computing device may determine the rate of change of the property by comparing a current measurement to a previously received measurement. For example, the computing device can determine the rate of change of the mass flow rate using two or more mass flow rate measurements received from the coriolis flow meter. One of the mass flow rate measurements may have been received and stored by the computing device at blocks 502 and 504.

At block 508, the computing device determines if the rate of change of the fuel flow property exceeds a pre-set limit. If at block 508 the computing device determines that the rate of change of the property does not exceed the pre-set limit, then the process returns to block 502.

If at block 508 the computing device determines that the rate of change of the property exceeds the pre-set limit, then at block 510 the computing device instructs a shutdown device to stop fuel flow through the flow path to the engine.

Figure 6:
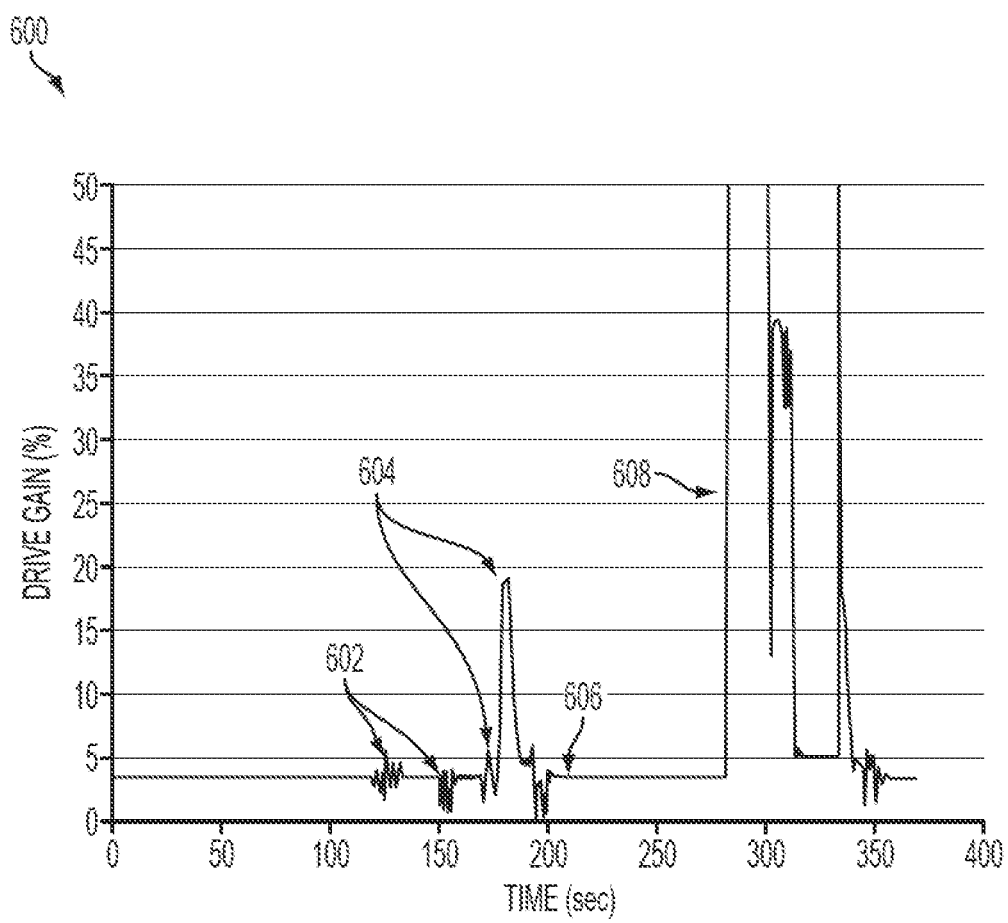
FIG. 6 is an example of a graph of drive gain of a fuel flow over a period of time according to one aspect of the present disclosure.

FIG. 6 depicts graphical changes 600 in the drive gain, measured by a coriolis flow meter, of a fuel flow as different phases are present in the fuel flow over a period of time that the fuel is flowing. In FIG. 6, the x-axis corresponds to the fuel flow over a period of time (measured in seconds) and the y-axis corresponds to the drive gain measured as a percentage value. In some aspects, a graphical representation of the measured property of the fuel flow over a period of time may be generated by a computing device for display on a graphical user interface.

A single-phase flow has a drive gain of less than approximately 5%, as shown at point 602 and measured by a coriolis flow meter. The single phase flow can be air or gas or another single phase flow. The drive gain may subsequently increase with the introduction of two-phase flow (e.g., air and water) to a value above 5% as depicted at points 604. The drive gain may return to a level that is below 5% when the fuel flow returns to single phase flow at point 606. The drive gain may also quickly and substantially increase when the fuel flow is slug flow (a liquid-gas two-phase flow in which the gas phase is in large bubbles). As shown at point 608, slug flow can have a drive gain in excess of 35%. A pre-set limit in the range of approximately 5%-7%, for example, may be used to indicate the presence of two-phase flow or multi-phase flow. In one aspect, a drive gain pre-set limit of 6.9% can indicate the presence of two-phase flow. The computing device can instruct the shutdown device to stop fuel flow to the engine in response to determining the drive gain of the fuel flow exceeds the pre-set limit.

In another aspect, the liquid density of a fuel flow can be used to determine the presence of two-phase flow or multiphase flow in a fuel flow. The liquid density measurement of single phase gas flow can remain near zero. If two-phase flow or multiphase flow is introduced, the liquid density measurement of the fuel flow can quickly increase. If the liquid density measurement increases above a pre-set limit, for example 0.53 lb/ft$^3$, it may indicate the presence of two-phase flow or multiphase flow. The computing device can instruct the shutdown device to stop fuel flow to the equipment's engine in response to determining the liquid density of the fuel exceeds the pre-set limit.

In another aspect, the mass flow rate of a fuel flow can be used to determine the presence of two-phase flow or multiphase flow in a fuel flow. For example, a sudden change in the mass flow rate of the fuel flow over a short period of time can indicate the presence of two-phase flow or multiphase flow. A computing device or other peripheral device can determine the rate of change of the mass flow rate of the fuel flow and can compare the rate of change over a period of time to a pre-set limit. If the rate of change of the mass flow rate exceeds a pre-set limit, for example 12 lb/hr/sec, it may indicate the presence of two-phase flow or multiphase flow. The computing device can instruct the shutdown device to stop fuel flow to the engine in response to determining the rate of change of the mass flow exceeds the pre-set limit. The computing device can receive a pre-set limit for each measured property from input by a user.

Figure 7:
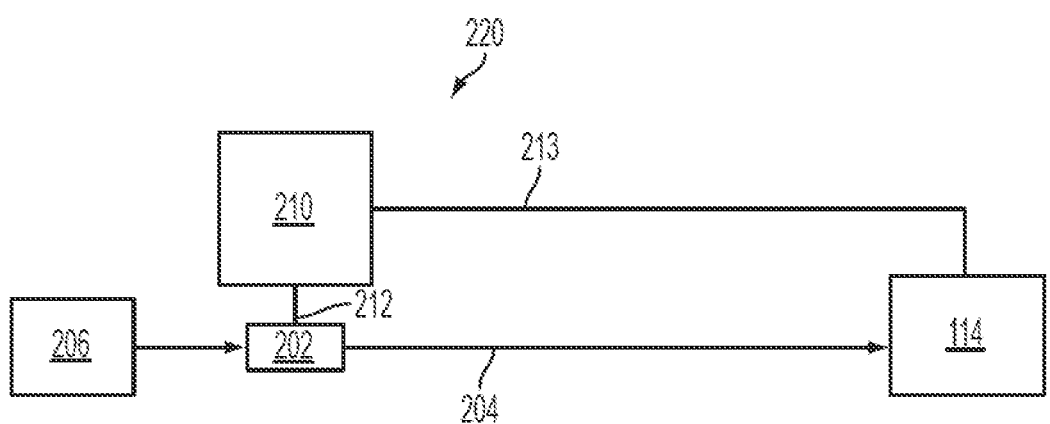
FIG. 7 is a schematic illustration of an emergency shutdown system according to one aspect of the present disclosure.

FIG. 7 is a schematic illustration of an aspect of the emergency shutdown system 220 that includes a coriolis flow meter 202 positioned in a flow path 204 between a fuel gas source 206 and equipment 114 having a gaseous consuming engine. In some aspects, a mass flow meter, densometer, or other suitable flow measurement device may be used instead of the coriolis flow meter 202. The coriolis flow meter 202 may measure various properties of the fuel flowing through flow path 204. For example, the coriolis flow meter 202 can measure the drive gain, the liquid density, or the mass flow rate of the fuel flowing through the flow path 204.

The computing device 210 may receive the measurement of the fuel flow property from the coriolis flow meter 202. An example of the computing device 210 is described in further detail with respect to FIG. 3. In some aspects, the coriolis flow meter 202 may output a signal having a current that corresponds to the measurement of the property of the fuel. The coriolis flow meter 202 may communicate the measurement to the computing device 210 via a communication link 212. The communication link 212 can be wired and can include interfaces such as Ethernet, USB, IEEE 1394, or a fiber optic interface. In another aspect, the communication link 212 can be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network).

The presence of two-phase flow (e.g., liquid and gas) or multiphase flow (e.g., liquid, gas, and oil) in the fuel gas flow may result in changes to the properties measured by the coriolis flow meter 202. When the drive gain measurement or liquid density measurement of the fuel flow passing through the coriolis flow meter 202 is larger than a pre-set limit it can indicate the presence of two-phase flow or multiphase flow. The pre-set limit associated with each property of the fuel flow (e.g., drive gain, liquid density, and mass flow rate) can be received by the computing device 210 from input by a user.

In some aspects, the computing device 210 may store the property measurement received from the coriolis flow meter 202. For example, the computing device 210 may receive and store measurements of the mass flow rate of the fuel flow over a period of time. The computing device 210 may determine the rate of change of the mass flow rate using the stored measurements. When the rate of change of the mass flow rate is larger than a pre-set limit it can indicate the presence of two-phase flow or multiphase flow.

The computing device 210 is in communication with the equipment 114 having a gaseous consuming engine via a communication link 213. The communication link 213 can be wired and can include interfaces such as Ethernet, USB, IEEE 1394, or a fiber optic interface. In another aspect, the communication link 213 can be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). If the computing device 210 determines that the measurement of the property of the fuel flow exceeds the pre-set limit, the computing device 210 may instruct the engine of the equipment 114 to shutdown. The computing device 210 can prevent the fuel flow having a two-phase or multiphase flow from reaching and damaging the engine of the equipment 114 by instructing the engine of the equipment 114 to shutdown when two-phase or multiphase flow is detected.

In one aspect, a system can include a flow measurement device that is positionable in a flow path between a fuel source and an engine. The flow measurement device can measure a property of a fuel flow through the flow path. The system can also include a shutdown device that is positionable in the flow path for controlling the fuel flow through the flow path to the engine. A computing device can be communicatively coupled to the shutdown device and the flow measurement device and can receive a measurement of the property and determine the presence of two-phase flow or multiphase flow in the flow path using the measurement.

In another aspect, a system can include a flow measurement device positioned in a flow path between a fuel source and an engine. The flow measurement device can measure a property of the fuel flow through the flow path. A computing device can be communicatively coupled to the engine. The computing device can also be communicatively coupled to the flow measurement device for receiving a measurement of the property and determining the presence of two-phase flow or multiphase flow in the flow path using the measurement.

In another aspect, a method of detecting and preventing two-phase flow or multiphase flow to an engine is provided. A computing device receives a measurement of a property of a fuel flow measured by a flow measurement device. The flow measurement device can be positionable in flow path between a fuel source and an engine. The presence of two-phase flow or multiphase flow in the flow path is determined by the computing device. The fuel flow through a shutdown device is controlled by the computing device in response to determining two-phase flow or multiphase flow is present in the flow path. The shutdown device can be positionable in the flow path between the flow measurement device and the engine.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a flow measurement device positionable in a flow path between a fuel source and an engine for measuring a property of a fuel flow through the flow path;
   a shutdown device positionable in the flow path for controlling the fuel flow thorough the flow path to the engine; and
   a computing device communicatively coupled to the shutdown device and the flow measurement device for receiving a measurement of the property and determining the presence of two-phase flow or multiphase flow in the flow path using the measurement.

2. The system of claim 1, wherein the presence of two-phase flow or multiphase flow in the flow path corresponds to the measurement of the property exceeding a pre-set value.

3. The system of claim 1, wherein the property is drive gain, liquid density, or mass flow rate.

4. The system of claim 1, wherein the flow measurement device is a coriolis flow meter.

5. The system of claim 1, wherein the shutdown device is a valve having an open position that allows the fuel flow to pass through the flow path and a closed position that prevents the fuel flow from passing through the flow path.

6. The system of claim 1, wherein the computing device is communicatively coupled to the engine and the engine is controllable to shutdown in response to the computing device determining two-phase flow or multiphase flow is present in the flow path.

7. The system of claim 1, wherein the shutdown device is controllable to stop the fuel flow from passing through the flow path to the engine in response to the computing device determining two-phase flow or multiphase flow is present in the flow path.

8. A method comprising:
   receiving, by a computing device, a measurement of a property of a fuel flow measured by a flow measurement device, the flow measurement device positionable in a flow path between a fuel source and an engine;
   determining, by the computing device, the presence of two-phase flow or multi-phase flow in the flow path; and
   controlling, by the computing device, the fuel flow through a shutdown device in response to determining two-phase flow or multi-phase flow is present in the flow path, the shutdown device positionable in the flow path between the flow measurement device and the engine.

9. The method of claim 8, further comprising:
   storing, by the computing device, two or more measurements of the property over a period of time;
   determining, by the computing device, a rate of change of the property over the period of time.

10. The method of claim 9, wherein determining the presence of two-phase flow or multiphase flow in the flow path further comprises:
    determining, by the computing device, that the rate of change of the property exceeds a pre-set value.

11. The method of claim 8, wherein determining the presence of two-phase flow or multiphase flow in the flow path further comprises:
    determining that the measurement of the property exceeds a pre-set value.

12. The method of claim 8, wherein receiving a measurement of a property of a fuel flow measured by the flow measurement device further comprises:
    receiving the measurement of the property, wherein the property is drive gain, liquid density, or mass flow rate.

13. The method of claim 8, further comprising:
    communicating, by the computing device, an instruction to the shutdown device to stop the fuel flow through the flow path to the engine in response to determining the measurement exceeds a pre-set value.

14. The method of claim 10, further comprising:
    communicating, by the computing device, an instruction to the shutdown device to stop the fuel flow through the flow path to the engine in response to determining the rate of change of the property exceeds the pre-set value.

15. The method of claim 8, further comprising:
    communicating, by the computing device, an instruction to the engine to shutdown in response to determining two-phase flow or multiphase flow is present in the flow path.

16. A system comprising:
    a flow measurement device positionable in a flow path between a fuel source and an engine for measuring a property of a fuel flow through the flow path;
    a computing device communicatively coupled to the engine and the flow measurement device for receiving a measurement of the property and determining the presence of two-phase flow or multiphase flow in the flow path using the measurement.

17. The system of claim 16, wherein the presence of two-phase flow or multiphase flow in the flow path corresponds to the measurement of the property exceeding a pre-set value.

18. The system of claim 16, wherein the property is drive gain, liquid density, or mass flow rate.

19. The system of claim 16, further comprising:
a shutdown device positionable in the flow path for controlling the fuel flow thorough the flow path to the engine and communicatively coupled to the computing device,
wherein the shutdown device is controllable to stop the fuel flow from passing through the flow path to the engine in response to the computing device determining two-phase flow or multiphase flow is present in the flow path.

20. The system of claim 16, wherein the engine is controllable to shutdown in response to the computing device determining two-phase flow or multiphase flow is present in the flow path.

* * * * *